United States Patent Office 3,335,793
Patented Aug. 15, 1967

3,335,793
METHOD AND COMPOSITION FOR IMPROVING AND MAINTAINING THE CAPACITY OF WATER INJECTION WELLS
Jerry W. Biles and Jack A. King, Tulsa, Okla., assignors to Cities Service Oil Company, a corporation of Delaware
No Drawing. Filed Nov. 30, 1964, Ser. No. 414,861
19 Claims. (Cl. 166—9)

ABSTRACT OF THE DISCLOSURE

A method and composition for use in waterflooding of oil bearing formations to improve recovery therefrom by improving the water permeability of the oil bearing formation to the water wherein a solid composition comprising a non-substituted dibasic carboxylic acid or anhydride or mixture thereof having 4 to 8 carbon atoms, and having a weighted average solubility between 0.01 and 20 grams per 100 grams of water at 20° C. and a non-ionic surface active agent. The preferred solid composition is a mixture of an ortho isomer of phthalic acid or anhydride, citric acid and Pluronic F-68 a polymer of propylene oxide and ethylene oxide in the ratio by weight of about 49½:49½:1.

---

The present invention relates to improving and maintaining the water permeability of subterranean oil-bearing formations in the vicinity of water injection wells. More particularly, it relates to a method and composition suitable for use in water injection wells in the secondary recovery of petroleum by waterflooding.

Waterflooding comprises the injection of water into an injection well penetrating an oil-bearing formation, forcing the injected water through the oil-bearing reservoir rock so as to move the oil contained therein into production wells and recovering the oil from said production wells. The success of waterflood operations is dependent upon a number of factors such as the permeability and porosity of the openings in the oil-bearing strata through which the water is to be pumped, and the composition, viscosity and surface tension of the oil contained therein.

The injection water employed in waterflooding should be of a type that does not tend to plug the formation so as to lower the injection rate and/or raise the injection pressure necessary to inject the water into the formation. Preferably, the injection water should be of such a type that in its passage through the formation, it will tend to improve the permeability thereof. It has been found, however, that some formations into which water is injected contain swelling clays, such as montmorillonite, which assumes a voluminous, hydrated form in the presence of water, thereby resulting in greater resistance to flow of injected flood water. Also, the wells and formations into which water is injected often become clogged with water insoluble deposits of calcium and iron compounds. These deposits likewise tend to decrease the permeability of the formation, thereby lowering the injection rate and/or raising the necessary injection pressure to maintain the desired water injection rate.

Various methods have been employed for treating water injection wells and the surrounding formations to increase their capacity to accept injected flood water at higher injection rates and/or at lower injection pressures. Such methods include hydraulic fracturing, conventional acidizing with hydrochloric acid or sulfuric acid, and small treatments with concentrated sulfamic acid solutions. Water injection wells have also been treated with solutions of chloro-substituted organic acids, hydroxy-substituted organic acids, and non-substituted monocarboxylic acids, such as chloroacetic acid, citric acid and butyric acid, as disclosed in U.S. Patents 2,175,079, 2,852,077, and 2,957,853, respectively.

None of the prior solutions have been entirely satisfactory in providing a continuous improvement and/or maintenance of water injectivity of subterranean formations at a reasonable cost. For example, hydraulic fracturing is often unsatisfactory due to its relatively high cost, the rapid decline of injectivity following treatment, and the danger of fracturing into a strata into which it is not desirable to inject flood water. Conventional acidizing likewise tends to be expensive and carries the danger of opening up strata in which the injection of water is not desired. Batch treatment with acids is often unsatisfactory because of the rapid decline of injectivity following treatment. Injecting acidic floodwater through the injection tubing is undesirable because of the corrosion problems resulting therefrom.

It is, therefore, an object of the present invention to provide an improved method and composition for improving and/or maintaining the water permeability of oil bearing formations during waterflooding.

It is another object of this invention to provide an injection well treatment whereby the plugging tendency of insoluble heavy metal and alkaline earth precipitates during waterflooding is impeded.

It is another object to provide a process and composition for the continuous treatment of injection wells to maintain and/or improve water injectivity during waterflooding.

It is a further object of the present invention to provide a process and composition to increase the capacity of water injection wells without subjecting the injection tubing to high injection pressure or prolonged contact with corrosive fluids.

With these and other objects in view, particular embodiments of the invention are hereinafter described, the novel features of which are pointed out in the appended claims.

The objects of the present invention are accomplished by placing a limited solubility organic acid composition, in solid form, at the bottom of the injection well where it is slowly dissolved by the injection water used in waterflooding. Dissolving the acid at the bottom of the well eliminates the corrosion problem that normally accompanies the addition of acid in solution from the surface. Since some of these acids have limited solubility and, consequently, a slow dissolving rate, the present invention provides a convenient means for continuously acidizing the formation. The dissolved acid prevents the deposition of calcareous and iron compounds from the injection water and dissolves acid soluble materials already present in the formation. The dissolved acid also causes formation clays to assume and maintain a minimum volume, thus offering the least resistance to the flow of injection water through the formation.

The limited solubility organic acids found to be acceptable for use in the present invention comprise those non-substituted dibasic carboxylic acids having from about 4 to about 8 carbon atoms. The solid composition containing one or more of these acids should have a weighted average solubility between the range of 0.01 and 20 grams per 100 grams of water at 20° C. For the purpose of the present invention, the term "dibasic acid" is used to include not only the acid, but also the corresponding anhydride form of the particular acid. The dibasic carboxylic acid employed may be either saturated or unsaturated. Furthermore, the unsaturated, non-substituted dibasic carboxylic acid may be either aromatic or non-aromatic.

Among the saturated dibasic carboxylic acids suitable for the present invention, succinic acid and anhydride and glutaric acid are preferred.

Among the suitable unsaturated dibasic carboxylic acids containing an aromatic ring, the ortho isomer of phthalic acid and anhydride are preferred. Among the non-aromatic, unsaturated carboxylic acids, maleic acid and anhydride and fumaric acid are preferred.

The various acids suitable for use in the present invention may be employed separately or in combination with each other in any desired proportions to achieve a desired dissolving rate. For example, maleic acid, which is quite soluble in water, should be employed in combination with a less soluble acid so that the weighted average solubility of the composition is within the limits indicated above. These various acids may also be used in combination with other organic acids in such ratios as are required to effect a desired dissolving rate. Among the acids that may be mixed with the dibasic carboxylic acids of the present invention to obtain a desired dissolving rate are citric acid, malonic acid, gluconic acid, salicylic acid, tartaric acid, sulfamic acid and crotonic acid. The composition of the solid acid stick employed may vary widely, depending on the particular dissolving rate desired for a given waterflooding process.

In order to avoid coating the solid acid with oil associated with recycled produced water, it is desirable to include a small amount of a solid, nonionic surface active agent in the solid acid mixture of the present invention. This surface active agent may be employed in amounts up to about 3% by weight of the total weight of the solid acid mixture placed in the injection well. A particularly suitable nonionic surface active agent is a polymer of propylene oxide and ethylene oxide, marketed by Wyandotte Chemicals Corporation under the tradename Pluronic F-68. Examples of other suitable nonionic surface active agents can be found in an article by John W. McCutcheon appearing in the July, August, September, and October 1952 issues of Soap and Sanitary Chemicals.

The total amount of solid acid placed in the bottom of the injection well will depend upon the nature and characteristic of the formation in question, the injection water used in the waterflooding operation, and the dissolving rate of the solid acid employed. A sufficient amount of solid acid will be placed in the bottom of the injection well to assure the continuous acidizing treatment of the formation at acid concentrations of from about 0.001% to about 0.20% of acid by weight.

The acids and anhydrides of the present invention are formed into shapes that may be conveniently added to injection wells by means of conventional pressure or melt casting techniques. In melt casting, the temperature used is approximately the melting point of the highest melting constituent in the composition of the stick. For pressure casting, the pressure employed is that required for plastic deformation. The most convenient shape will generally be cylindrical sticks that can be dropped down injection well tubings without difficulty. A preferred solid acid mixture is ortho-phthalic anhydride, citric acid, and Pluronic F-68 employed in the ratio of 49½:49½:1 by weight. This mixture is melt cast at 155° C. into cylinders 1" in diameter and 10" long with a tapered end that is placed downward in the injection tubing to avoid hanging up at irregularities at joints or elsewhere in the injection well tubing.

The solid acid sticks placed in the bottom of an injection well form a loosely porous bed at the bottom of the wellbore. A closely packed bed should be avoided since it tends to increase the pressure requirement or correspondingly decrease the injection rate. The normal water injection employed in waterflooding slowly dissolves the cylindrical sticks, thus continually supplying acid to the formation being waterflooded.

The invention is further illustrated by the following examples which are not intended to limit the scope of the invention as indicated in the appended claims.

A Hart Sand core was employed in a flow test to determine the effect of low concentration of phthalic anhydride on the permeability of the core. The permeability to 20% sodium chloride was first obtained as shown in Table I. When the injection fluid was switched to a solution of 0.019% phthalic anhydride in 20% sodium chloride, the permeability averaged 54% higher than the average permeability to 20% sodium chloride.

TABLE 1

| Time (minutes) | Injection Fluid | Permeability (millidarcies) |
|---|---|---|
| Start | 20% sodium chloride | |
| 8 | ----do---- | 2.06 |
| 18 | ----do---- | 1.85 |
| 28 | ----do---- | 1.66 |
| 36 | ----do---- | 1.57 |
| 38 | ----do---- | 1.43 |
| 48 | ----do---- | 1.37 |
| 58 | ----do---- | 1.20 |
| 68 | 0.019% phthalic anhydride in 20% sodium chloride. | 2.43 |
| 78 | ----do---- | 2.84 |
| 88 | ----do---- | 2.69 |
| 98 | ----do---- | 2.50 |
| 108 | ----do---- | 2.40 |
| 118 | ----do---- | 2.37 |
| 128 | ----do---- | 2.26 |
| 138 | ----do---- | 2.29 |
| 149 | ----do---- | 2.29 |

Flow tests with Hart Sand cores are run in which the injection water dissolves acid from solid sticks prepared by melt casting a more soluble acid such as succinic acid, maleic acid or citric acid, with ortho-phthalic anhydride and Pluronic F-68 employed in a weight ratio of 49½:49½:1, respectively. In all cases, an improvement in permeability is noted.

The effect of low concentrations of phthalic anhydride on the pH of various injection waters is shown in the results indicated in Table 2 as follows:

TABLE 2

| Injection Water | Percent Phthalic Anhydride (×1000) | pH |
|---|---|---|
| Santa Rosa | 0 | 8.1 |
| | 5 | 7.1 |
| | 10 | 6.7 |
| | 15 | 6.4 |
| | 20 | 6.2 |
| San Andres | 0 | 7.0 |
| | 5 | 6.7 |
| | 10 | 6.4 |
| | 15 | 6.1 |
| | 20 | 5.7 |
| Rock Crossing | 0 | 4.6 |
| | 5 | 3.1 |
| | 10 | 2.8 |
| | 15 | 2.6 |
| | 20 | 2.5 |
| Distilled Water | 0 | 6.4 |
| | 5 | 3.5 |
| | 10 | 3.3 |
| | 15 | 3.2 |

The pH is a useful measure of the benefits that can be obtained by acidizing. The lower the pH of the injection water used the more effective that injection water will be in dissolving the acid soluble materials normally encountered in the formation.

It will be understood that various changes and modifications in the invention may be made by those skilled in the art within the principle and scope of the invention as expressed in the appended claims.

We claim:
1. A solid stick-form acid composition for the continuous treatment of injection wells employed in the secondary recovery of oil from subterranean formations so as to maintain and improve the water permeability of said formations consisting essentially of at least one non- substituted dibasic carboxylic acid having from about 4 to about 8 carbon atoms, a second acid selected from the group consisting of citric acid, malonic acid, gluconic acid, salicylic acid, tartaric acid, sulfamic acid, crotonic acid and mixtures thereof; said second acid being in such quantity relative to the dibasic acid that the solid stick-form acid has a weighted average solubility between the range of 0.01 and 20 grams per 100 grams of water at 20° C., the composition having a weighted average solubility between the range of 0.01 to 20 grams per 100 grams of water at 20° C.

2. The composition of claim 1 in which the non-substituted dibasic carboxylic acid is saturated.

3. The composition of claim 1 in which the non-substituted dibasic carboxylic acid is unsaturated.

4. The composition of claim 1 in which the acid is employed in its anhydride form.

5. The composition of claim 1 in which the non-substituted dibasic carboxylic acid is selected from the group consisting of ortho-phthalic acid and anhydride; maleic acid and anhydride; fumaric acid; succinic acid and anhydride; glutaric acid; and mixtures thereof.

6. The composition of claim 1 and including a solid, nonionic surface active agent.

7. In the secondary recovery of oil from subterranean formations by waterflooding, including the steps of injecting water into an injection well, forcing the water from the well through the oil-bearing formation penetrated by said injection well, thereby moving the oil from the formation into a production well, and recovering the oil from said production well, the process for maintaining and improving the water permeability of said formation comprising placing a slowly dissolving acid composition in solid form in the bottom of said injection well, said solid acid comprising at least one non-substituted dibasic carboxylic acid having from about 4 to 8 carbon atoms in the amount of at least 49% by weight of the composition, and a second organic acid having a dissolving rate different than the dibasic carboxylic acid in sufficient quantity to obtain the composition having a weighted average solubility between the range of 0.01 and 20 grams per 100 grams of water at 20° C., whereby the solid acid is slowly dissolved and carried into the formation by the injection water so as to continuously acidize the formation, thus preventing the deposition of calcareous and iron compounds from the injection water and dissolving acid soluble materials already present in the formation, and causing formation clays to assume a minimum volume, thus offering the least resistance to the flow of injection water through the formation.

8. The process of claim 7 in which the dibasic carboxylic acid is employed in its anhydride form.

9. The process of claim 7 in which the non-substituted dibasic carboxylic acid is selected from the group consisting of ortho-phthalic acid and anhydride; maleic acid and anhydride; fumaric acid; succinic acid and anhydride; glutaric acid; and mixtures thereof.

10. The process of claim 9 wherein the second organic acid is selected from the group consisting of citric acid, malonic acid, gluconic acid, salicylic acid, tartaric acid, sulfamic acid, crotonic acid, and mixtures thereof.

11. The process of claim 10 and including in the solid acid mixture a solid, nonionic surface active agent.

12. The process of claim 7 wherein the second organic acid is selected from the group consisting of citric acid, malonic acid, gluconic acid, salicylic acid, tartaric acid, sulfamic acid, crotonic acid, and mixtures thereof.

13. The process of claim 7 and including in the solid acid mixture a solid, nonionic surface active agent.

14. The process of claim 7 in which the solid acid placed in the bottom of the injection well is in the form of at least one cylindrical stick capable of being dropped readily through the injection well so as to form a loosely porous bed at the bottom of the injection well.

15. A solid stick-form composition for the continuous treatment of injection wells employed in the secondary recovery of oil from subterranean formations so as to maintain and improve the water permeability of said formation, comprising:
 (a) ortho-phthalic anhydride;
 (b) citric acid; and
 (c) Pluronic F–68, a nonionic surface active agent where the proportion by weight of the ortho-phthalic anhydride, the citric acid and the Pluronic F–68 is approximately 49½:49½:1, respectively.

16. In the secondary recovery of oil from subterranean formations by waterflooding including the steps of injecting water into an injection well, forcing the water from the well through oil-bearing formation penetrated by said injection well, thereby moving the oil from the formation into a production well, and recovering the oil from said production well, the process for maintaining and improving the water permeability of said formation comprising:
 placing a slowly dissolving solid composition comprising ortho-phthalic anhydride, citric acid and Pluronic F–68, a nonionic surface active agent, in the ratio by weight to each other respectively of approximately 49½:49½:1 in the bottom of said injection well, the composition having a weighted average solubility between the range of 0.01 and 20 grams per 100 grams of water at 20° C., whereby the solid acid is slowly dissolved and carried into the formation by the injection water so as to continuously acidize the formation, thus preventing the deposition of calcareous and iron compounds from the injection water and dissolving acid soluble materials already present in the formation, and causing formation clays to assume a minimum volume, thus offering the least resistance to the flow of injection water through the formation.

17. A solid stick-form acid composition for the continuous treatment of injection wells employed in the secondary recovery of oil from subterranean formations so as to maintain and improve the water permeability of said formations consisting essentially of phthalic acid in the amount of at least 49% by weight of the composition and a second organic acid having a dissolving rate different than the phthalic acid in sufficient quantity to obtain a composition which dissolves at a rate of 0.01 to 20 grams per 100 grams of water at 20° C.

18. The composition of claim 17 wherein the second organic acid is selected from the group consisting of citric acid, malonic acid, gluconic acid, salicylic acid, tartaric acid, sulfamic acid, crotonic acid and mixtures thereof.

19. The composition of claim 18 and including a solid, nonionic surface active agent.

References Cited

UNITED STATES PATENTS

| | | | |
|---|---|---|---|
| 2,717,876 | 9/1955 | Menaul | 252—8.55 |
| 2,799,660 | 7/1957 | Nicholls et al. | 252—408 |
| 2,839,466 | 6/1958 | Shock et al. | 166—42 X |
| 2,852,077 | 9/1958 | Cocks | 166—42 X |
| 3,073,387 | 1/1963 | Dunning et al. | 166—43 X |

CHARLES E. O'CONNELL, *Primary Examiner.*

STEPHEN J. NOVOSAD, *Examiner.*